(12) United States Patent
Braun et al.

(10) Patent No.: US 10,019,469 B1
(45) Date of Patent: Jul. 10, 2018

(54) PROVIDING SERVICES IN A DATA STORAGE SYSTEM

(71) Applicant: EMC Corporation, Hopkinton, MA (US)

(72) Inventors: Robin C. Braun, Hollis, NH (US); Adnan Sahin, Needham, MA (US); Fidelma Russo, Sudbury, MA (US); Greg Findlen, Hopkinton, MA (US); Sonny Zhao, Waltham, MA (US); Kate Gladziszewski, Boston, MA (US); Marion Lally, Canton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 126 days.

(21) Appl. No.: 13/836,185

(22) Filed: Mar. 15, 2013

(51) Int. Cl.
*G06F 12/02* (2006.01)
*G06F 17/00* (2006.01)
*G06F 17/30* (2006.01)
*G06Q 30/04* (2012.01)

(52) U.S. Cl.
CPC ....... *G06F 17/30312* (2013.01); *G06Q 30/04* (2013.01)

(58) Field of Classification Search
CPC .................................................. G06Q 2220/00
USPC .............................. 705/16, 34; 711/162, 170
See application file for complete search history.

(56) References Cited

U.S. PATENT DOCUMENTS

| 8,380,960 B2 * | 2/2013 | Jia ....................... H04L 67/1097 709/214 |
| 2003/0051111 A1* | 3/2003 | Nakano ............... G06F 11/2058 711/162 |
| 2006/0218364 A1* | 9/2006 | Kitamura ............. G06F 3/0605 711/162 |
| 2012/0323821 A1* | 12/2012 | Crk .................. G06Q 10/08345 705/400 |

* cited by examiner

*Primary Examiner* — Rokib Masud
(74) *Attorney, Agent, or Firm* — Anderson Gorecki LLP

(57) ABSTRACT

A catalog of services defines which storage-related services are applied to each service level of storage where storage capacity is managed and allocated in terms of chunks of capacity at different service levels. Each service level is defined based on one or more of tiered storage policy settings, drive size, drive speed, drive count, RAID protection, engine fractions, bandwidth and availability and characterized by one or more performance capabilities. Examples of services in the catalog include but are not limited to mobility, availability, continuity, and recovery services. Any combination of services, or no services at all, can be associated with a given service level of storage. Services may be performed at different performance levels. Further, services may be provided on-demand and billed on a usage basis.

24 Claims, 5 Drawing Sheets

PROVIDING SERVICES IN A DATA STORAGE SYSTEM

CROSS-REFERENCE TO RELATED APPLICATIONS

NA

BACKGROUND OF THE INVENTION

The invention is generally related to electronic data storage systems which are associated with a network. Enterprise and service provider data storage systems are used to maintain relatively large data sets. A simple data storage subsystem includes a storage array and a host device. Applications Read and Write data by sending IO requests to the host device via the network. The host device translates the IO requests from a format characterized by designators used by applications, e.g., filename, into a format characterized by designators used by the storage array, e.g., LUN, cylinder and track, in order to prompt a Read or Write in accordance with the IO request. Clusters of hosts and storage arrays can be organized into a data center. Groups of data centers can be organized into a single data storage system. A wide variety of technologies are known for preventing interruptions of business operations due to data storage problems. However, the costs associated with these technologies tend to increase in relation to increases in data storage capacity and other factors. Moreover, some of the resources required to implement these technologies are only used in the event of an emergency and associated costs may be difficult for an enterprise or service provider to justify if the probability and cost of a particular type of data storage problem cannot be accurately calculated.

SUMMARY OF THE INVENTION

In accordance with an aspect an apparatus comprises: a data storage array having a plurality of physical data storage devices which define a data storage capacity of the storage array, the data storage devices including at least first and second storage devices characterized by different performance metrics; a first data record which associates chunks of the data storage capacity of a predetermined size with ones of the physical storage devices, and which indicates a service level for the chunks, wherein there are multiple service levels and each service level is indicative of a level of performance; a second data record which associates a service with at least one of the service levels; and logic which performs the service on data stored at the service level with which the service is associated.

In accordance with another aspect a method comprises: in a data storage array having a plurality of physical data storage devices which define a data storage capacity of the storage array, the data storage devices including at least first and second storage devices characterized by different performance metrics, associating chunks of the data storage capacity of a predetermined size with ones of the physical storage devices; associating each chunk with a service level of a plurality of service levels indicative of different levels of performance; allocating chunks of data storage capacity at each service level; associating a service with at least one of the service levels; and performing the service on data stored at the service level with which the service is associated.

An advantage associated with some aspects is extending a service catalog to enable association of different sets of services with different sets of storage capacity characterized by levels of service. As described in U.S. patent application Ser. No. 13/609,398, titled SERVICE LEVEL BASED DATA STORAGE, filed contemporaneously herewith and incorporated by reference, the data storage capacity of a storage array, data center or networked data storage system can be managed and allocated in terms of chunks of capacity at different service levels, where each service level is defined based on one or more of tiered storage policy settings, drive size, drive speed, drive count, RAID protection, engine fractions, bandwidth and availability and characterized by one or more performance capabilities, e.g., IOs per second. A catalog of services defines the service levels and storage-related services that may be applied to each service level. Examples of services include but are not limited to mobility, availability, continuity, and recovery services. Any combination of services, or no services at all, can be associated with a given service level of storage. Consequently, each service level can be associated with a unique set of services. Moreover, the services may be provided at different levels. For example, a recovery point service could be characterized by level parameters such as a recovery point objective (RPO) and recovery time objective (RTO). The enterprise may specify the services to be associated with each service level of storage and also the level of the service if multiple levels are defined. Moreover, billing may be based on the one or more of service level of storage, service associated with the service level of storage, and level of service, each of which may be at a specified cost per unit of storage.

Another advantage associated with aspects of the invention is providing services on-demand and billing based on usage. The resources required to implement some services are relatively costly and may increase as a function of data storage capacity. Moreover, some of the resources required to implement these technologies are only used in the event of an emergency. By providing services on-demand and billing on a usage basis the costs to a service provider or enterprise can be reduced.

Other features and advantages will become apparent in view of the detailed description and figures.

DETAILED DESCRIPTION

Some aspects of the invention may be partially or wholly implemented in one or more computer programs. The computer programs are stored on non-transitory computer-readable memory and implement processes which may be defined by steps when utilized by general processor, specialized processor, or combination of processing devices.

Figure 1:
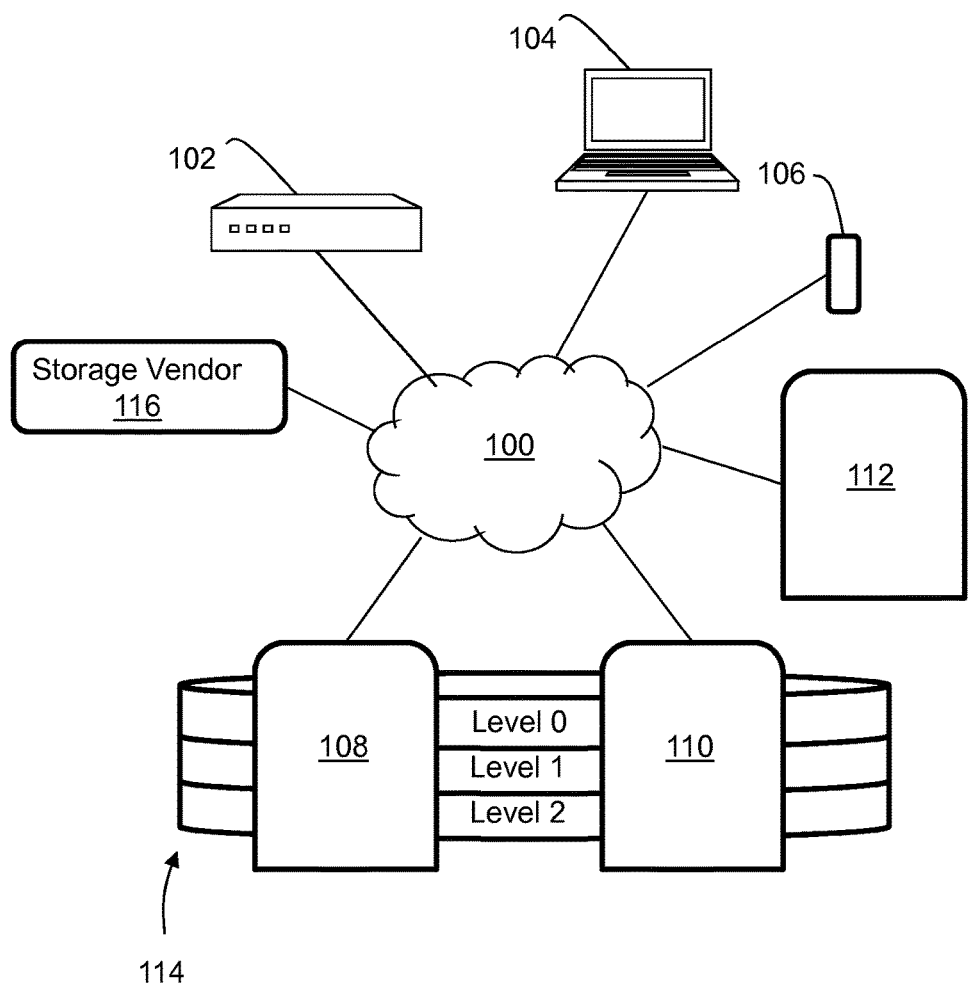
FIG. 1 illustrates a "cloud" environment in which a storage vendor manages provision of various services to a service provider or enterprise.

FIG. 1 illustrates a "cloud" environment in which various computing devices utilize a data storage system via a network 100. The computing devices may include, for example and without limitation, servers 102, personal computers 104 and handheld mobile devices 106. The data storage system may include, for example and without limitation, data centers 108, 110, which may be operated by an enterprise or service provider (hereafter the example of a service provider is used). Data centers 108, 110 may be configured such that storage resources associated with the different data centers are presented and utilized as a single logical set 114 of storage resources including hosts and logical volumes from the perspective of the computing devices. Until recently the assets of different data centers were not integrated in a manner which supported such a presentation of resources. EMC VPLEX differs from such typical prior art systems because it enables federation of information across multiple data centers such that hosts and volumes located in different data centers function as if located in the same data center, at least from the perspective of a client application. Such federation is advantageously practical even where the distance between the data centers is so great that synchronous Write IOs would result in unacceptable delay because in at least some configurations the system has active/active asynchronous capability, e.g., a volume can be shared by two VMs located at different data centers at distances typically associated with asynchronous topologies. Data center 112, which may be operated by a storage vendor or a third party, could also contribute resources to the single logical set 114. As will be explained in greater detail below, a service management device 116 coordinates available resources in order to provide various storage-related services to the service provider, and those service may be provided using the single logical data set 114. Moreover, different services may be associated with particular service levels of storage.

The logical set of storage resources is organized and managed based on service levels (Levels 0 through 2 in the illustrated example), where each service level is indicative of a particular level of performance. For example, each service level might be characterized by a minimum level or range of performance measured in terms of IO operations per unit time that can be performed, e.g., Level 0 being characterized by best performance in terms of IOs per second, Level 2 being characterized by lowest performance in terms of IOs per second, and Level 1 being characterized by performance between that of Level 0 and Level 2 in terms of IOs per second. Other differentiators which could be associated with service levels include but are not limited to media type (e.g., flash, phase-change memory (PCM), magnetic, etc.), rotational speed (e.g., 15K rpm, 10K rpm, 7.2K rpm, 5.4K rpm, etc.) and data protection e.g., (RAID-1, RAID5, RAID-6, erasure coding, etc.). An authorized user or storage manager can allocate and de-allocate chunks of storage resources of a predetermined size at a particular level to an entity, where the entity may be an application, type of application, user, type of user, user group, device, type of device, or any other identifiable consumer of storage resources.

Figure 2:
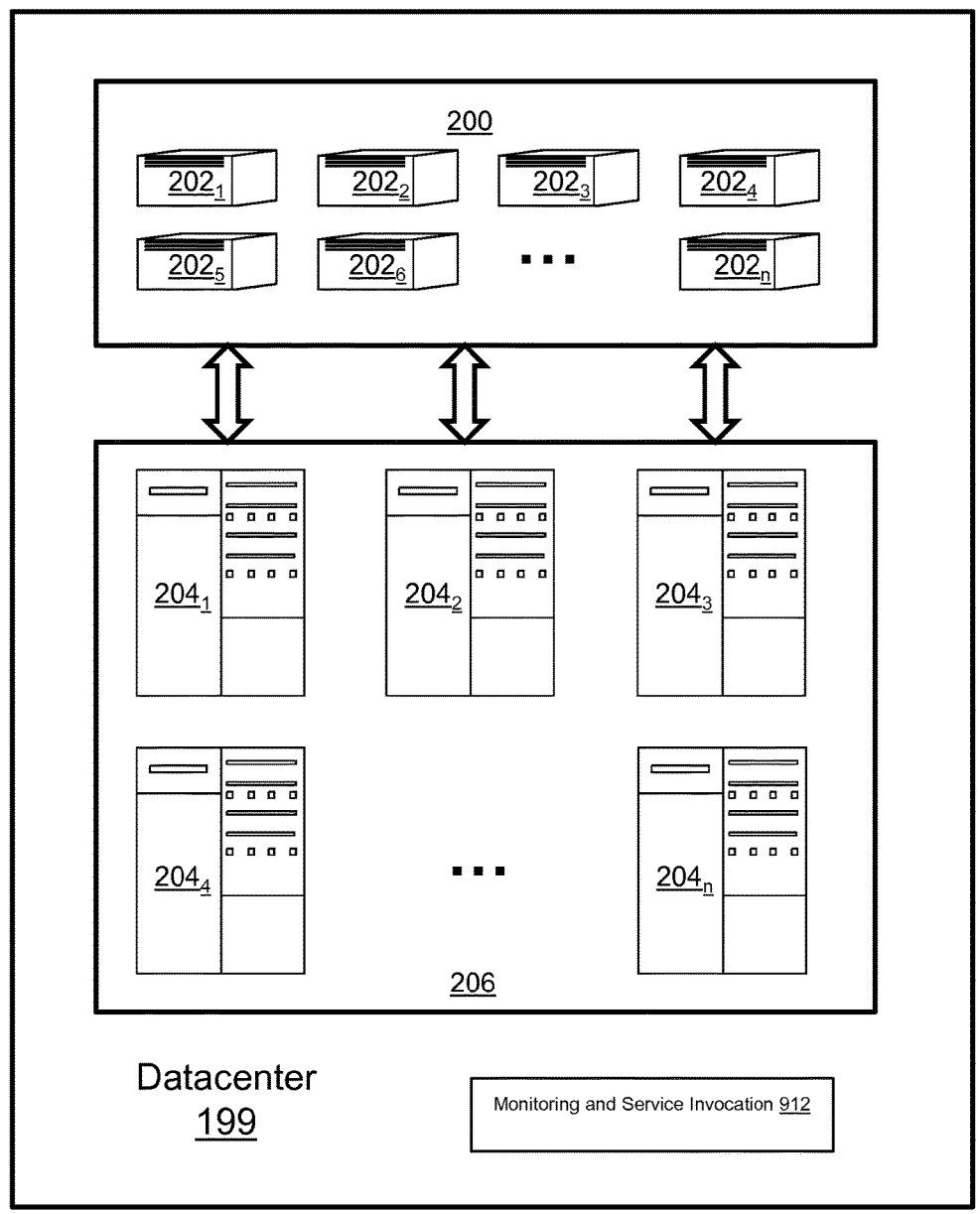
FIG. 2 illustrates a data center in greater detail.

FIG. 2 illustrates an exemplary data center 199 in greater detail. The exemplary data center could serve as a service provider data center or a storage vendor data center. The exemplary data center includes at least one cluster 200 of physical server devices 202₁ through 202ₙ (hosts) and at least one cluster 206 of one or more data storage arrays 204₁ through 204ₙ. The hosts and data storage arrays are typically in communication via high bandwidth links. In general, the data storage arrays respond to IO requests from the hosts. Each host may support multiple instances of virtual hosts (virtual machines), and the data center is configured to selectively enable any virtual machine to utilize the storage resources of any storage array. The data center also includes a monitoring and service invocation function. The monitoring and service invocation function monitors resource utilization and is responsive to signals from devices inside or outside the data center indicating a need for a service.

Figure 3:
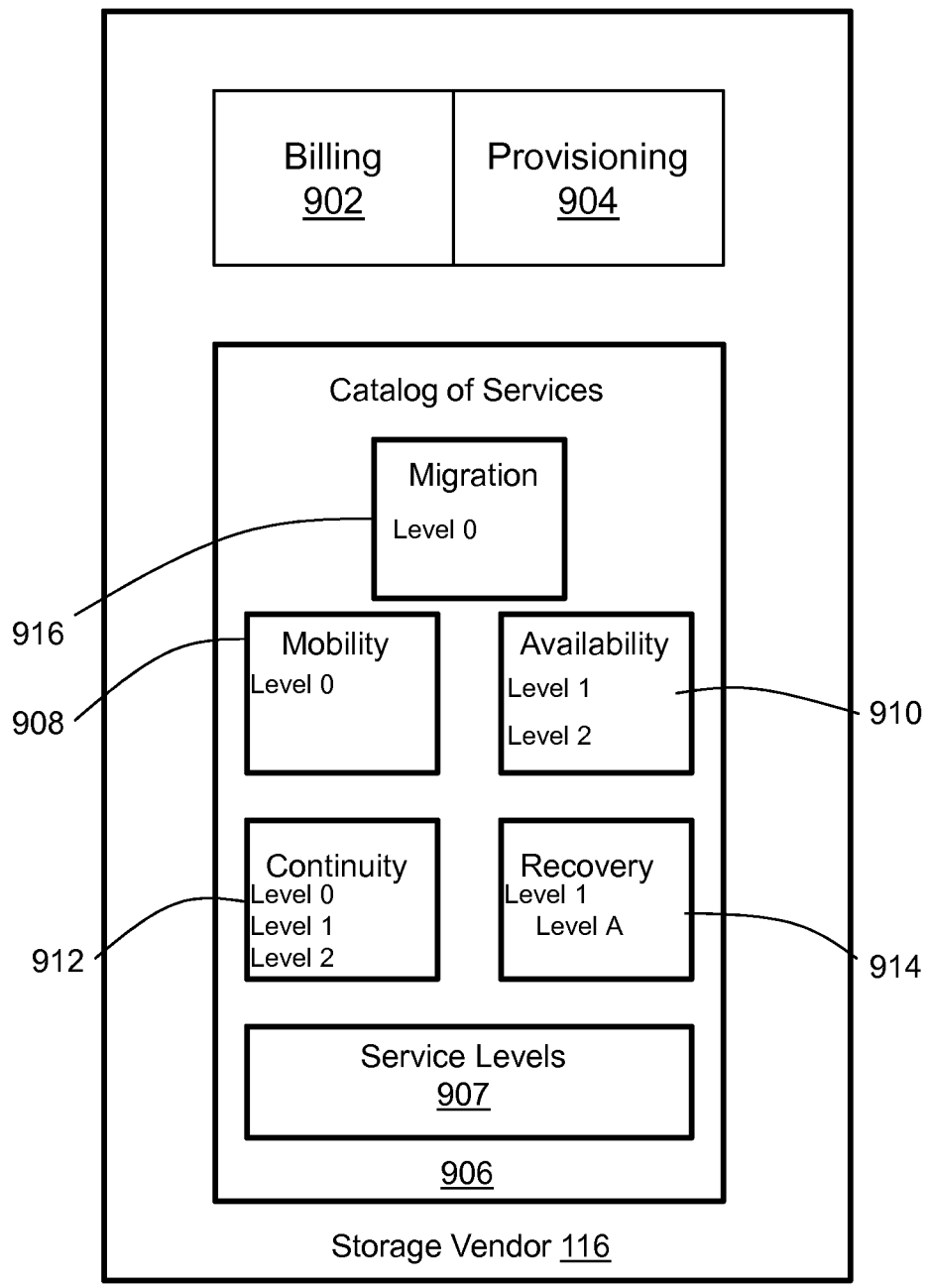
FIG. 3 is a functional block diagram of the storage vendor device.

FIG. 3 is a functional block diagram of the storage vendor device 116. The storage vendor device may include a server with software including a provisioning module 904, a billing module 902, and a catalog of services 906. The provisioning module 904 functions to provision storage-related services which are listed in the catalog of services 906. The billing module 902 functions to calculate billing data associated with services selected by or provided to the service provider by the storage vendor. The catalog of services, which may be implemented on one or more line cards, includes data records 907 indicating which storage resources are associated with each service level and the amount of storage capacity allocated at each service level, and data records 908, 910, 912, 914, 916 that indicate which services are associated with the various service levels. Examples of services include but are not limited to migration, mobility, availability, continuity, and recovery. The customer chooses how to extend the base service catalog with the additional availability features. Logic for implementing the services may be distributed on various devices including device 116. Mobility service might include moving data to a different logical or physical device within a storage array, moving data to a different storage array, and moving hosts (instantiating new VMs on other servers which may be at the same data center or a different data center). Availability service might include multiple active copies of a data set. Continuity service might include snaps, clones and other procedures related to backup and protection. Recovery service might include recreating hosts and data sets at an alternate site. In the illustrated example data record 908 indicates that mobility service is associated with storage capacity at service level 0. Consequently, data stored at service level 0 is moved when necessary by the mobility service logic. The mobility service is not associated with service levels 1 and 2 so data stored at those service levels is not moved by the mobility service. Any combination of services, or no services at all, can be associated with a given service level of storage. The services may also be provided at different performance levels. For example, Levels A and B of a recovery point service could be characterized by different performance level parameters such as recovery point objective (RPO) and recovery time objective (RTO). The recovery point objective defines the amount of data that the service provider is willing to lose in the event that a system has to be recovered. The recovery time objective defines the amount of time allowed for a system or application to be recovered and fully functional for use by the service provider. The enterprise may specify the level of the service to be provided to the storage service level if multiple levels of service are defined. In the illustrated example Level A recovery service is associated with storage capacity at service level 1. Moreover, the source and target side may be at different service levels.

Figure 4:
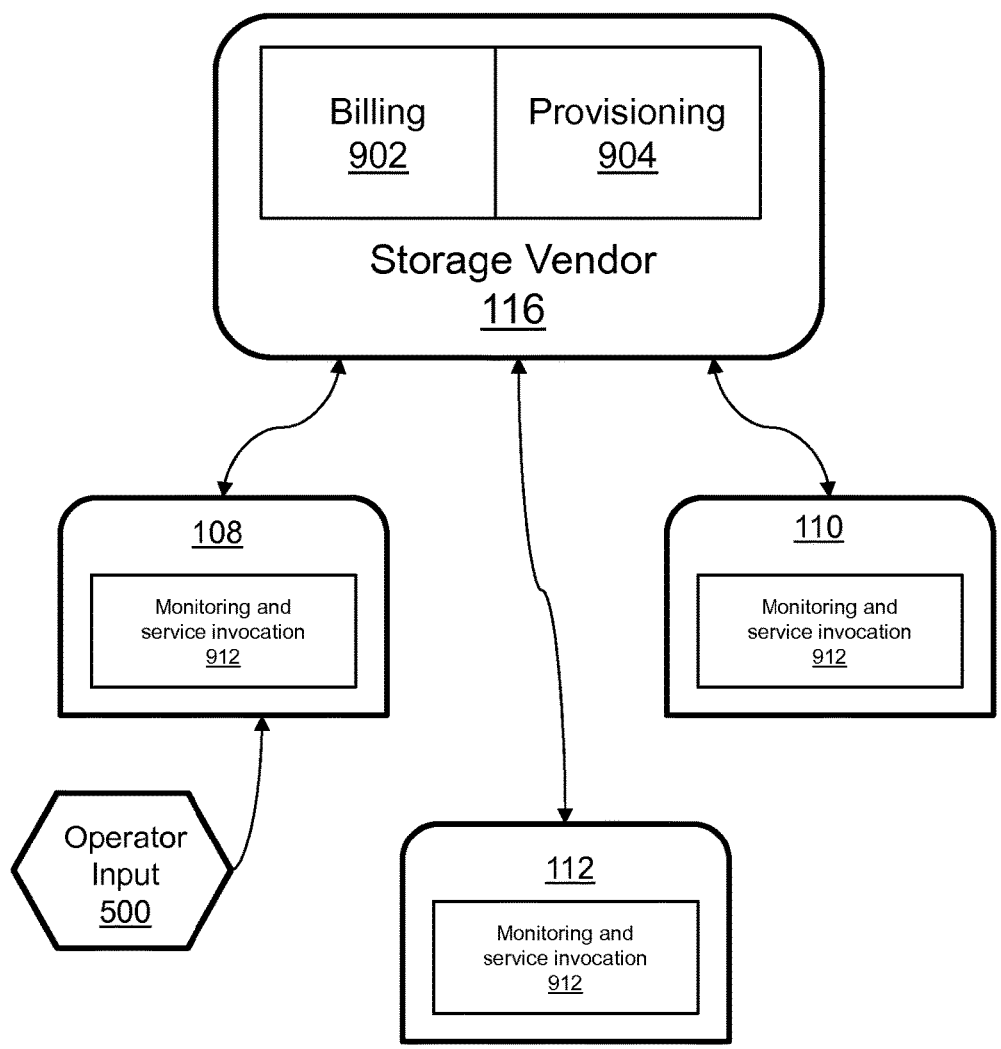
FIG. 4 is a block diagram which illustrates service invocation and billing.
Figure 5:
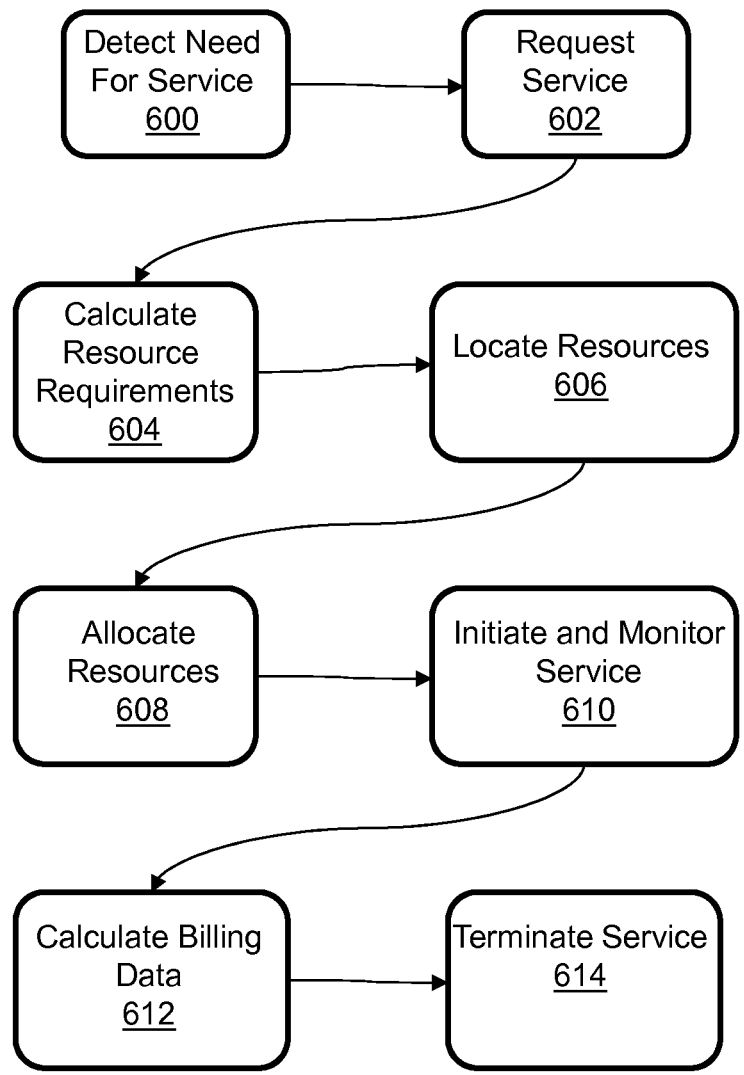
FIG. 5 is a flow diagram which illustrates service invocation and billing.

FIGS. 4 and 5 illustrate service invocation and billing. Billing may be based on one or more of service level of storage, service associated with the service level of storage, and level of service, each of which may be at a specified cost per unit of storage. An initial step 600 is to detect a need for a service. The need for a service can be automatically identified by the monitoring and service invocation module 912 of data center 108, or manually identified via operator input 500. The service invocation module may utilize a wide variety of known techniques to automatically recognize the onset or occurrence of a storage-related problem. To provide an example with context, a need for mobility because of an impending natural disaster at the geographical location of data center 108 could be recognized by an operator. In response, the operator could manually input an indication of the need to migrate hosts and data to a different geographical site. In step 602 an indication of the requested service is provided by the service invocation module 912 of data center 108 to the provisioning module 904 of storage vendor device 116. The provisioning module assesses the request to determine whether the service is associated with the storage service level at which the data is stored and calculate the resources required to satisfy the request in step 604. If the service is associated with the storage service level at which the data is stored then the provisioning module locates the required resources in step 606. Locating the resources may include signaling to the monitoring modules of one or more data centers to determine current and projected resource availability. However, the monitoring modules of various data centers might signal resource availability to the provisioning module of the storage vendor device in order to facilitate resource location. The information about available resources is used by the provisioning module to select resources to provide the service. In this example data and hosts are being migrated away from data center 108 so resources at sites other than data center 108 are selected, but in practice the resources for certain services might be located in the data center which issued the request. The provisioning module then signals to devices associated with the selected resources to allocate the resources in step 608. The devices may respond with acknowledgments. The monitoring and service invocation modules of data center 108 and the other data centers associated with provision of the service then initiate and monitor the service in Step 610. The billing module calculates billing data for the service in step 612. The monitoring and service invocation modules also coordinate to terminate the service when appropriate in step 614. Unlike previous arrangements wherein the resources required for instantiating a service were leased or sold to a service provider in advance of use, the presently described system allows the service provider to purchase services on demand, e.g., when there is a need for the service. However, the services need not necessarily be purchased on demand. For example, and without limitation, billing could be based on cost per unit storage at the service level and the service or services associated with that level of storage.

It should be appreciated that the data storage and other resources for providing the services may be in the service provider data centers 108, 110, the storage vendor data center 110, or both. For example, data center 110 may be over-provisioned by the storage vendor in order to support on-demand services. Moreover, storage vendor data center 112 may be used to provide on-demand services to multiple service providers. Still further, more than one data center may be utilized to provide the service. For example, resources of storage vendor data center 112 could be used to augment resources of data center 108 or data center 110 in order to provide a service to data center 110.

Any of a wide variety of billing models can be used by the billing module to calculate charges for the service. For example, and without limitation, the service might be billed on a flat fee basis, based on the amount and type of resources used per unit of time, or combinations thereof. Other examples include billing based on performance requested or provided, and based on the amount of resources utilized, e.g., cost per GB. Moreover, a particular service may be billed based on the performance level of the service provided or selected.

While the invention is described through the above exemplary embodiments, it will be understood by those of ordinary skill in the art that modification to and variation of the illustrated embodiments may be made without departing from the inventive concepts herein disclosed. Moreover, while the embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. An apparatus comprising:
    a data storage array having a plurality of physical data storage devices which define a data storage capacity of the storage array, the data storage devices including at least first and second storage devices characterized by different performance metrics;
    a first data record which associates chunks of the data storage capacity of a predetermined size with ones of the physical storage devices, and which indicates a respective service level for ones of the chunks, wherein there are multiple service levels and each service level is indicative of a level of performance in terms of input/output operations performed per unit time;
    a second data record which associates storage-related services with the service levels such that a first service level is associated with a first storage-related service, and the first storage-related service is not associated with a second service level; and
    at least one compute node comprising:
        logic that determines from the first data record that a data set is stored in chunks at the first service level;
        logic that determines from the second data record that the first storage-related service is associated with the first service level; and
        logic which performs the first storage-related service on the data set in response to determining that the data set is stored in chunks at the first service level and the first storage-related service is associated with the first service level.

2. The apparatus of claim 1 further comprising a service management device which locates resources required to provide the first storage-related service, initiates provision of the first storage-related service, and calculates billing data associated with provision of the first storage-related service.

3. The apparatus of claim 2 including a third data record which associates a service performance level with the first storage-related service for the service level.

4. The apparatus of claim 2 wherein the data storage array is in a first data center, and wherein at least part of the located resources are in a second data center.

5. The apparatus of claim 4 wherein the first data center is an enterprise or service provider data center and the second data center is a storage vendor data center.

6. The apparatus of claim 2 wherein the first storage-related service is one of a plurality of storage-related services including at least one of: mobility service, availability service, continuity service, and recovery service.

7. The apparatus of claim 6 wherein the mobility service includes moving the data set or hosts to a different logical or physical device.

8. The apparatus of claim 6 wherein the availability service includes creating multiple active copies of the data set.

9. The apparatus of claim 6 wherein the continuity service includes at least one of snap creation and clone creation.

10. The apparatus of claim 6 wherein the recovery service includes recreating at least one of hosts and the data set at an alternate site.

11. The apparatus of claim 1 wherein ones of the storage-related services are associated with ones of multiple service levels.

12. The apparatus of claim 11 wherein billing is calculated based on the service level and the storage-related services associated with that service level.

13. A method comprising:
in a data storage array having a plurality of physical data storage devices which define a data storage capacity of the storage array, the data storage devices including at least first and second storage devices characterized by different performance metrics, associating chunks of the data storage capacity of a predetermined size with ones of the physical storage devices;
associating each chunk with a respective service level of a plurality of service levels indicative of different levels of performance in terms of input/output operations performed per unit time;
allocating chunks of data storage capacity at each service level;
associating storage-related services with the service levels such that a first service level is associated with a first storage-related service, and the first storage-related service is not associated with a second service level;
determining from the first data record that a data set is stored in chunks at the first service level;
determining from the second data record that the first storage-related service is associated with the first service level; and
performing the first storage-related service on the data set in response to determining that the data set is stored in chunks at the first service level and the first storage-related service is associated with the first service level.

14. The method of claim 13 further comprising:
locating resources required to provide the first storage-related service;
initiating provision of the first storage-related service; and
calculating billing data associated with provision of the first storage-related service.

15. The method of claim 14 including associating a service performance level with the first storage-related service for the service level.

16. The method of claim 14 wherein the data storage array is in a first data center, and including locating at least part of the resources in a second data center.

17. The method of claim 16 wherein the first data center is an enterprise or service provider data center and the second data center is a storage vendor data center, and including federating resources of the storage vendor data center with resources of the enterprise or service provider data center.

18. The method of claim 14 wherein performing the first storage-related service comprises performing at least one of: mobility service, availability service, continuity service, and recovery service.

19. The method of claim 18 wherein performing the mobility service includes moving the data set or hosts to a different logical or physical device.

20. The method of claim 18 wherein performing the availability service includes creating multiple active copies of the data set.

21. The method of claim 18 wherein performing the continuity service includes creating a snap or a clone.

22. The method of claim 18 wherein performing the recovery service includes recreating at least one of hosts and the data set at an alternate site.

23. The method of claim 13 including associating ones of the storage-related services with ones of multiple service levels.

24. The method of claim 23 including calculating billing information based on the service level and the storage-related services associated with that service level.

* * * * *